United States Patent
Malfait et al.

(10) Patent No.: US 8,009,825 B2
(45) Date of Patent: Aug. 30, 2011

(54) SIGNAL PROCESSING

(75) Inventors: Ludo Malfait, Ipswich (GB); Paul Barrett, Ipswich (GB); Andrew Whitefield, Ipswich (GB)

(73) Assignee: Psytechnics Limited, Ipswich (GB)

( * ) Notice: Subject to any disclaimer, the term of this patent is extended or adjusted under 35 U.S.C. 154(b) by 518 days.

(21) Appl. No.: 12/235,659

(22) Filed: Sep. 23, 2008

(65) Prior Publication Data
US 2009/0080644 A1 Mar. 26, 2009

(30) Foreign Application Priority Data
Sep. 26, 2007 (EP) .................................... 07117264

(51) Int. Cl.
*H04M 9/00* (2006.01)
(52) U.S. Cl. ............................ 379/406.13; 379/406.12
(58) Field of Classification Search ............ 379/406.13, 379/406.12, 406.08, 406.01
See application file for complete search history.

(56) References Cited

U.S. PATENT DOCUMENTS
6,092,039 A * 7/2000 Zingher ........................ 704/221
2006/0140392 A1 6/2006 Ahmadi FOREIGN PATENT DOCUMENTS
WO 2004/021679 3/2004
* cited by examiner

*Primary Examiner* — Creighton Smith
(74) *Attorney, Agent, or Firm* — Fenwick & West LLP

(57) ABSTRACT

The present invention relates to detection of echo in telecommunications networks. The invention provides a method of echo detection comprising the steps of: generating a series of inbound vectors for an inbound signal; generating a series of outbound vectors for an outbound signal; repeating a predetermined number of comparison steps comprising the sub-steps of selecting an outbound vector from the outbound vectors; selecting an inbound vector from the inbound vectors; comparing said outbound vector with said inbound vector and with successive inbound vectors to generate a plurality of similarity metrics; and determining a relative position of the compared outbound vector having maximum correlation with said inbound vector; and counting the number of times each relative position is determined to be the position of maximum correlation.

11 Claims, 6 Drawing Sheets

SIGNAL PROCESSING

BACKGROUND a. Field of the Invention

The present invention relates to detection of echo in telecommunications networks. In this context the term echo refers to the problem encountered when someone speaking into a telephone system hears their own speech come back through their handset or speaker after a short delay. Even small amounts of audible echo can be disturbing to a talker and in extreme cases can render natural conversation virtually impossible.

The two most common sources of echo in a telephony system are electrical reflections and acoustical coupling (see FIG. 1 and FIG. 2). The main source of electrical reflections indicted by arrows 8 are two-wire/four wire conversion hybrid circuits 1, 2 used to interconnect two-wire transmission system 3 used between a local exchange 4 and phone 5 at the customer premises with four-wire transmission systems 6,7 used in the core network and telephone handsets. Acoustical coupling indicated by arrow 9 occurs in the remote party's telephone equipment when sound leaks from the earpiece or speaker into the microphone.

Echo is usually analysed using the concept of an echo path, which describes the route taken by a talker's outbound speech to and from the point where it passes into the return path and returns as echo. The echo path can be characterised in terms of its delay, frequency response and echo return loss (ERL). The delay is the time taken for a talker's speech to transit the echo path. The frequency response describes any spectral modification of the signal by the echo path. The ERL is the ratio of the level of the inbound echo with the level of the outbound speech that caused it—the smaller the figure, the louder the echo. Echo generally becomes a problem when the ERL of the echo path is 45 decibels (dB) or less and the path delay exceeds about 40 milliseconds (ms); people cannot generally distinguish echo from their own voice for delays less than 40 ms. The present invention is concerned with detecting the presence of audible echo and determining the delay of the echo path. Measurement of the ERL and frequency response of the echo path is outside of the scope of this invention.

Many telephone calls are made over relatively short distances with a round-trip delay of 40 ms or less, thus rendering any echo inaudible. However, for transcontinental and international connections the signal propagation delay can result in very much longer round-trip delays. Moreover, the electrical echo from hybrid circuits typically results in ERL figures in the order of 20 dB. For these reasons echo control equipment is installed in almost all international and long-haul switching centres, otherwise these routes would suffer from audible echo. Moreover, recent developments in telecommunications have seen the deployment of networks that inherently introduce long transmission delays, for example digital mobile radio typically introduce a round-trip delay of 200 ms and voice over IP systems can introduce delays of 40 ms upwards.

This means that so-called echo cancellers shown schematically in FIG. 3, are now deployed at the interfaces between such systems and the public switched telephone network (PSTN) by default. An echo canceller 20 comprises a model 23 of the expected echo due to an echo path 21. The model 20 generates a signal which is subtracted by a subtractor 22, from an incoming signal to compensate for speech reflected via the echo path 21. Signal 24 represents a talker's speech and signal 25 represents a talker's speech with cancelled echo.

Such cancellers are configured to cancel any network echo from the local part of the PSTN, for example with a delay of less than 128 ms, and it is assumed that if a call is routed to a more distant location there will be cancellers deployed at the far end.

Despite the introduction of echo cancellers, it is not uncommon for telephone systems to introduce audible echo. Typical reasons include an echo path with a round-trip delay that exceeds the capabilities of the closest canceller, misconfiguration of echo cancellation equipment, and the absence of echo cancellers altogether. It is therefore desirable to be detect the presence of un-cancelled echo so that remedial action can be taken.

Acoustic echo is the result of sound leaking from the handset speaker into its microphone. A commonly used measure of this leakage is terminal coupling loss (TCL), which is often calculated using a frequency weighting (TCLw). The TCLw exhibited by a plain old telephony system (POTS) handset tends to fairly good, and should exceed 45 dB. The same should be true of IP phones that are designed to look and feel like a POTS phone. However, mobile handsets tend to have much poorer TCLw figures because they are substantially smaller, and hence the transducers are closer together, and the designers have many more factors to balance against acoustic considerations. Hands-free telephony causes particular problems because sound from the speaker almost inevitably leaks into the microphone. An increasing number of mobile and hands-free terminals therefore have some form of acoustic echo control built-in, but there are still many handsets that do not. One of the problems associated with acoustic echo is that the echo path may rapidly time-varying due to changes in the primary sources of reflection, which in the case of a handset will be due to interactions with the head, and in the case of a hands-free system may be due to movement of people and objects in the vicinity of the terminal.

If an echo path includes a non-linear component, it will no longer be possible to model the echo path as a simple linear filter. The most common example of such a non-linearity is a CELP speech coding algorithm such as GSM EFR or G.729. This means that attempts to cancel, or even simply measure, echo paths that contain speech compression will be problematic because such algorithms do not transmit the waveform entirely faithfully—indeed the signal-to-noise ratio of the combined coding and decoding process is typical only a few dB. The combination of speech coding and transmission errors, such as bit-errors in mobile networks and packet loss in VoIP networks, can lead to even more non-linear behaviour. The existence of such non-linear components is a good reason for locating any echo control as close to the source of echo as possible because this will avoid the problems described above. For example in a mobile handset, acoustic echo cancellation performed in the handset should only see a linear echo path, albeit time-varying. However, echo detection equipment may be located any point in the network and must therefore be capable of detecting echo from non-linear echo paths.

The problem is to design an echo detection method that can be located at any point in the network and reliably detect the presence of time-invariant or time-varying echo whether from an electrical or acoustical source over a wide range of operational conditions including the presence non-linear network elements. It is also desirable to provide an algorithm of lower complexity than known echo detection method.

The present invention in only concerned with detecting the presence of echo and determining the delay of the echo path; determination of the echo path loss and frequency response not envisaged.

b. Related Art

Echo detection may be thought of as locating a degraded search signal within a source signal.

It is known to locate a search signal within a source signal using a correlation between waveforms. It is also known to locate a search signal within a source signal by comparing features extracted from a waveform.

U.S. Pat. No. 6,826,350 "High Speed Signal Search Method and Recording Medium for Same" discloses a method for providing a high speed search method which compares features extracted from respective time waveforms, for example by using a correlation value or Euclidean distance between these features.

U.S. Pat. No. 6,651,041 "Method for executing automatic Evaluation of Transmission Quality of Audio Signals using Source/Received—Signal Spectral Co-variance" discloses calculation of a spectral similarity measure in dependence upon the value of the covariance of the spectra of two signals.

ITU-T Recommendation P.561, "In-service Non-intrusive Measurement Device", defines minimum performance requirements for such detection apparatus. It also, in Appendix I, describes two methods of detecting echo known to the art: cross-correlation analysis and adaptive filter analysis. The first method uses a simple cross-correlation calculation to detect similarities in time-domain waveforms of the send and receive signals. The adaptive filter analysis uses a similar architecture to an echo canceller to build a model of the echo path, but does not attempt to cancel the echo. However, both of these approaches assume that the echo path is linear and time-invariant—assumptions that as we have seen are not true in the presence of acoustic echo and non-linear echo paths. These two approaches are also highly susceptible to corruption of the echo signal. This means that they do not work reliably in the presence of high levels of acoustic background noise at the far end and require complex voice activity detection algorithms so that analysis can be suppressed during periods when the far party is talking.

The present invention solves these problems by utilising a similarity metric, such as a correlation function, to compare a Fourier transform of the signals in the send and receive directions.

SUMMARY OF THE INVENTION

According to the invention, there is provided a method of echo detection comprising the steps of: generating a series of inbound vectors for an inbound signal; generating a series of outbound vectors for an outbound signal; repeating a predetermined number of comparison steps comprising the sub-steps of selecting an outbound vector from the outbound vectors; selecting an inbound vector from the inbound vectors; comparing said outbound vector with said inbound vector and with successive inbound vectors to generate a plurality of similarity metrics; and determining a relative position of the compared outbound vector having maximum correlation with said inbound vector; and counting the number of times each relative position is determined to be the position of maximum correlation.

In the preferred embodiment the method also includes the step of counting relative positions having a similarity value close to the maximum correlation determined for said outbound vector. Preferably, a relative position is counted only in the event that the similarity metric exceeds a first threshold. Even more preferably, a relative position is counted only in the event that the outbound vector contains speech or foreground signal.

In the preferred embodiment a peak relative position is determined in dependence upon the relative position counted the most number of times. Preferably the method further comprises the step of determining the relative positions counted with a value equal to or close to said peak relative position.

In one embodiment the step of determining a likelihood that echo is present is determined in dependence upon the number of relative positions counted with a value equal to or close to said peak relative position. In another embodiment the step of determining a likelihood that echo is present is determined in dependence upon the number of relative positions counted. In either of these embodiments the step of determining a delay is in dependence upon said peak relative position.

The invention also provides a computer readable medium carrying a computer program, and a computer program for implementing the methods described above.

BRIEF DESCRIPTION OF THE DRAWINGS

Embodiments of the present invention will now be described, with reference to the accompanying drawings, in which.

DETAILED DESCRIPTION

The method of the invention analyses send and receive signals at an arbitrary point in a telephony network to determine if audible echo is present and if so, determines the delay of the echo path. The following description describes the analysis of a single echo path, i.e. echo from one direction; however it will be apparent that the analysis can be used to detect echo in either direction.

The method uses two buffers, an outbound buffer 100 containing a sequence of feature vectors of an outbound speech signal and an inbound buffer 200 containing sequence of feature vectors of an inbound speech signal. The following description relates to a single analysis phase which produces a single result set comprising the likelihood that echo is present and an estimate of an average (mean) echo path delay. It will be apparent that the analysis phase can be repeated over successive sections of a signal to produce a series of results sets.

Figure 1:
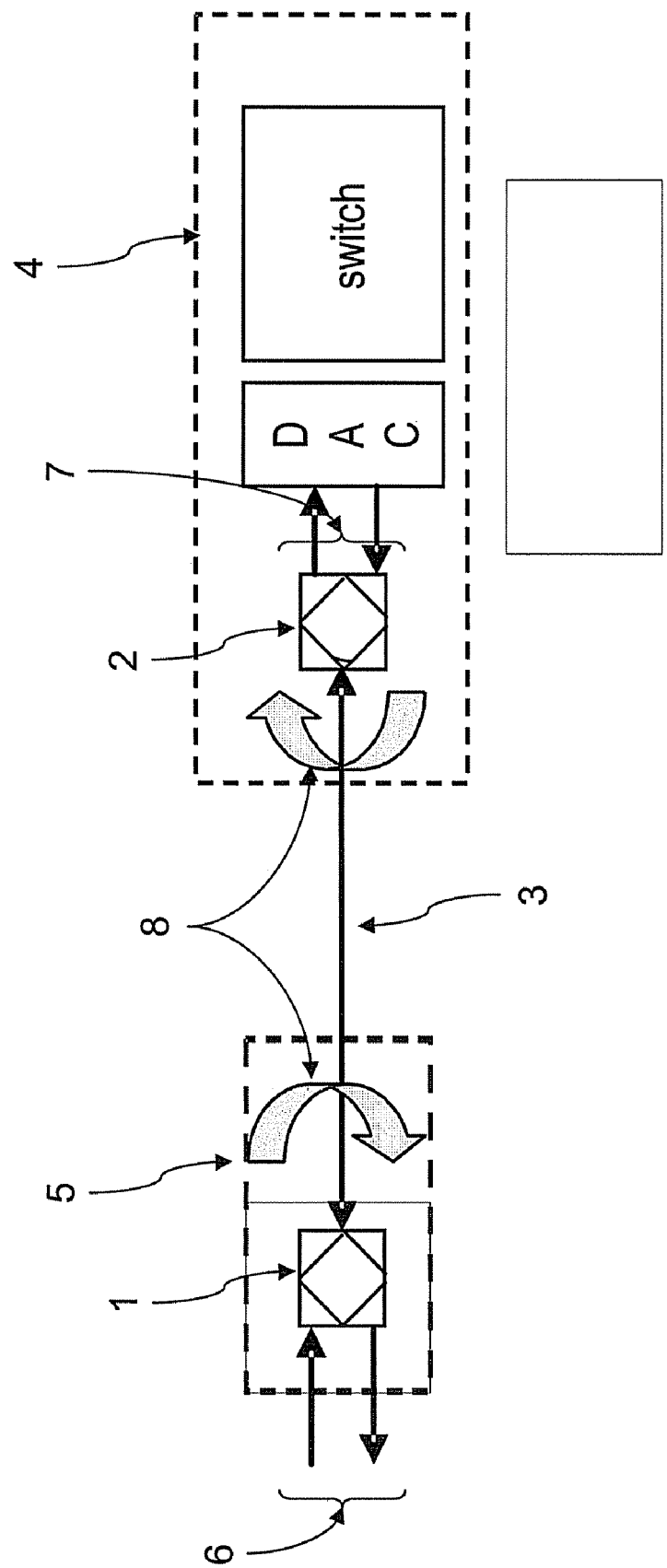
FIG. 1: is an illustration of electrical echo generation by 2/4 wire conversion hybrid circuits.
Figure 2:
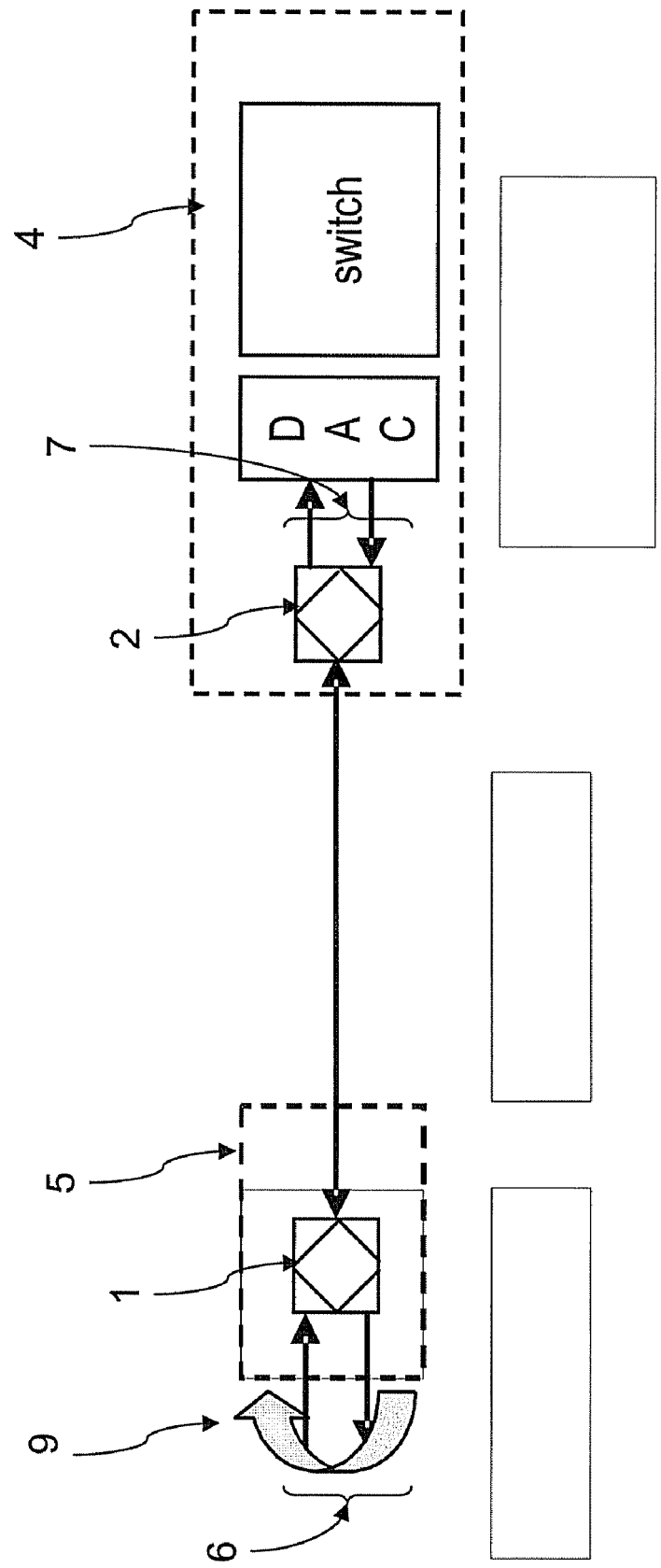
FIG. 2: is an illustration of acoustic echo generation.
Figure 3:
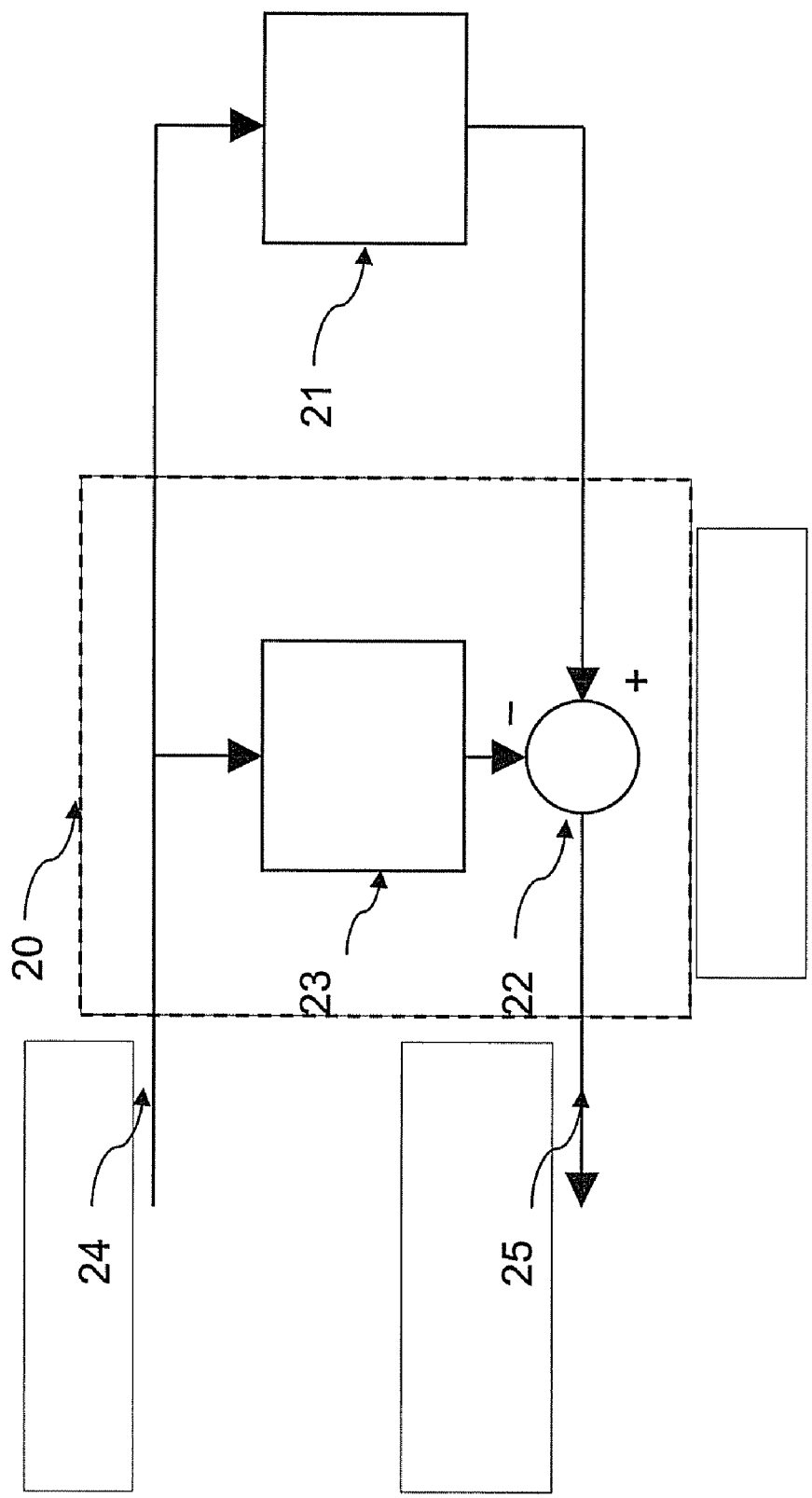
FIG. 3: is a block diagram showing a basic design of an echo canceller.
Figure 4:
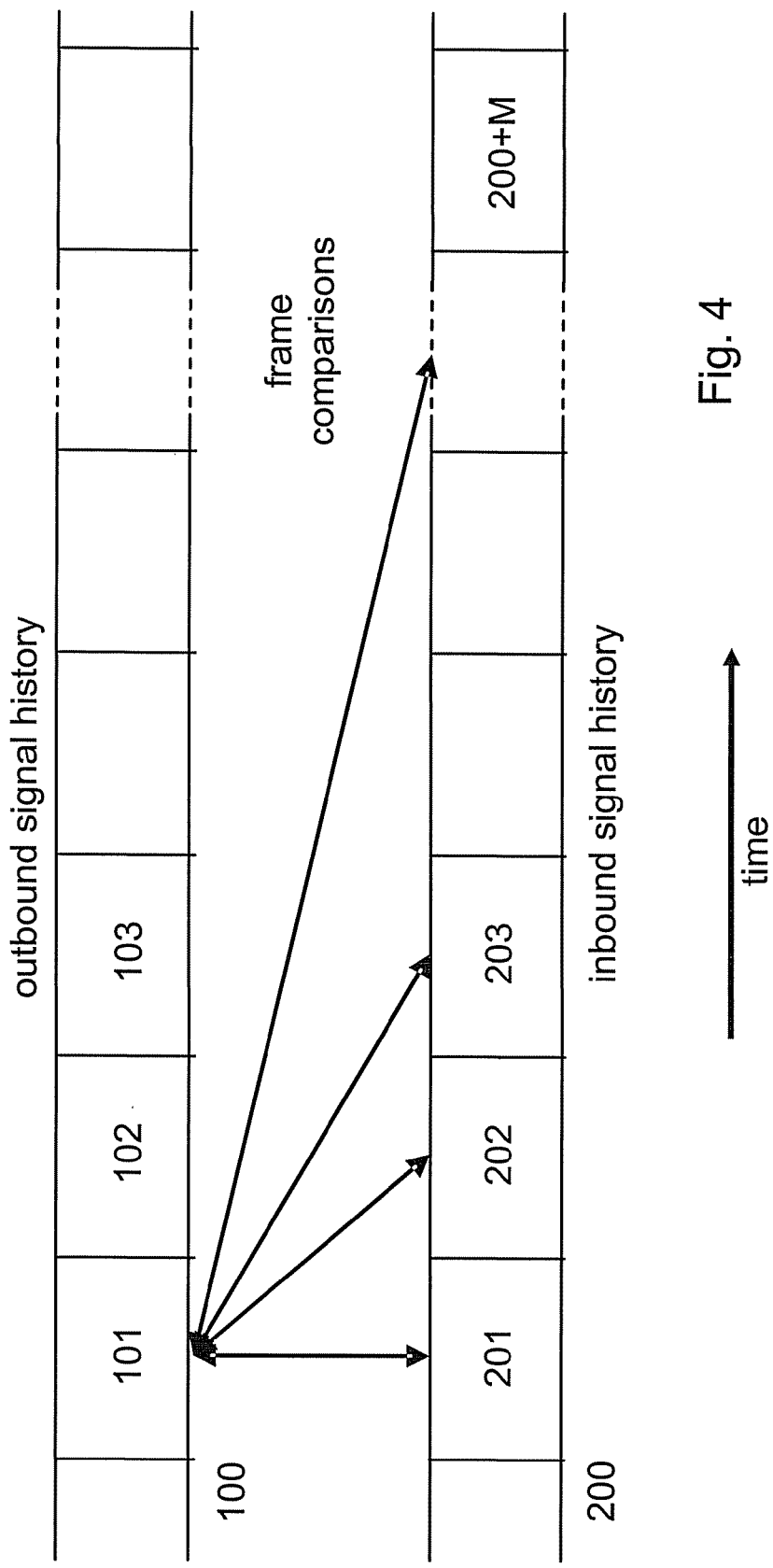
FIG. 4: illustrates comparison of a first selected vector of an outbound signal with a first selected vector and a plurality of successive vectors of an inbound signal.
Figure 6:
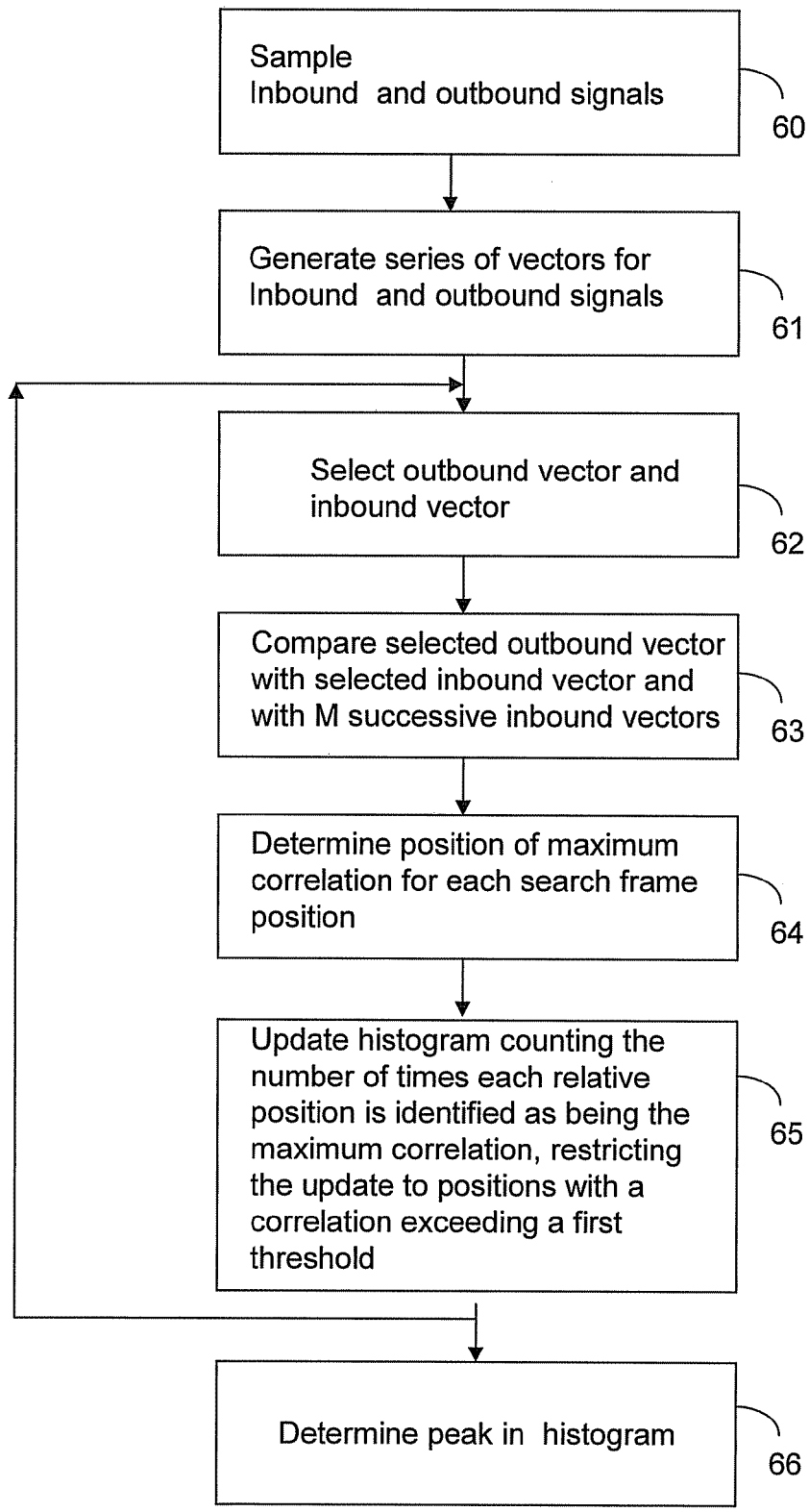
FIG. 6 is a flow chart illustrating the method of the present invention.

The echo detection method will now be described with reference to FIGS. 4 and 6.

At step 60 outbound signal 100 and inbound signal 200 are sampled. In the preferred embodiment of the invention the sampling rate is 8 KHz although it will be apparent that other sampling rates will work equally well.

At step 61 the sampled signals are converted into a series of Fourier spectra (vectors 201, 202 etc and 101, 102 etc) where each spectrum is calculated from a frame of N signal samples. In the preferred embodiment, each spectrum is calculated using a 256 point Fast Fourier Transform (FFT), hence N=256, using a rectangular window. In the preferred embodiment, the frames used to generate successive spectra overlap by 50% to increase the resolution of the echo path delay estimate. In the preferred embodiment the components of the spectrum are the magnitude of the Fourier coefficients; however the invention will work equally well if the components are the square of the magnitude.

Figure 5:
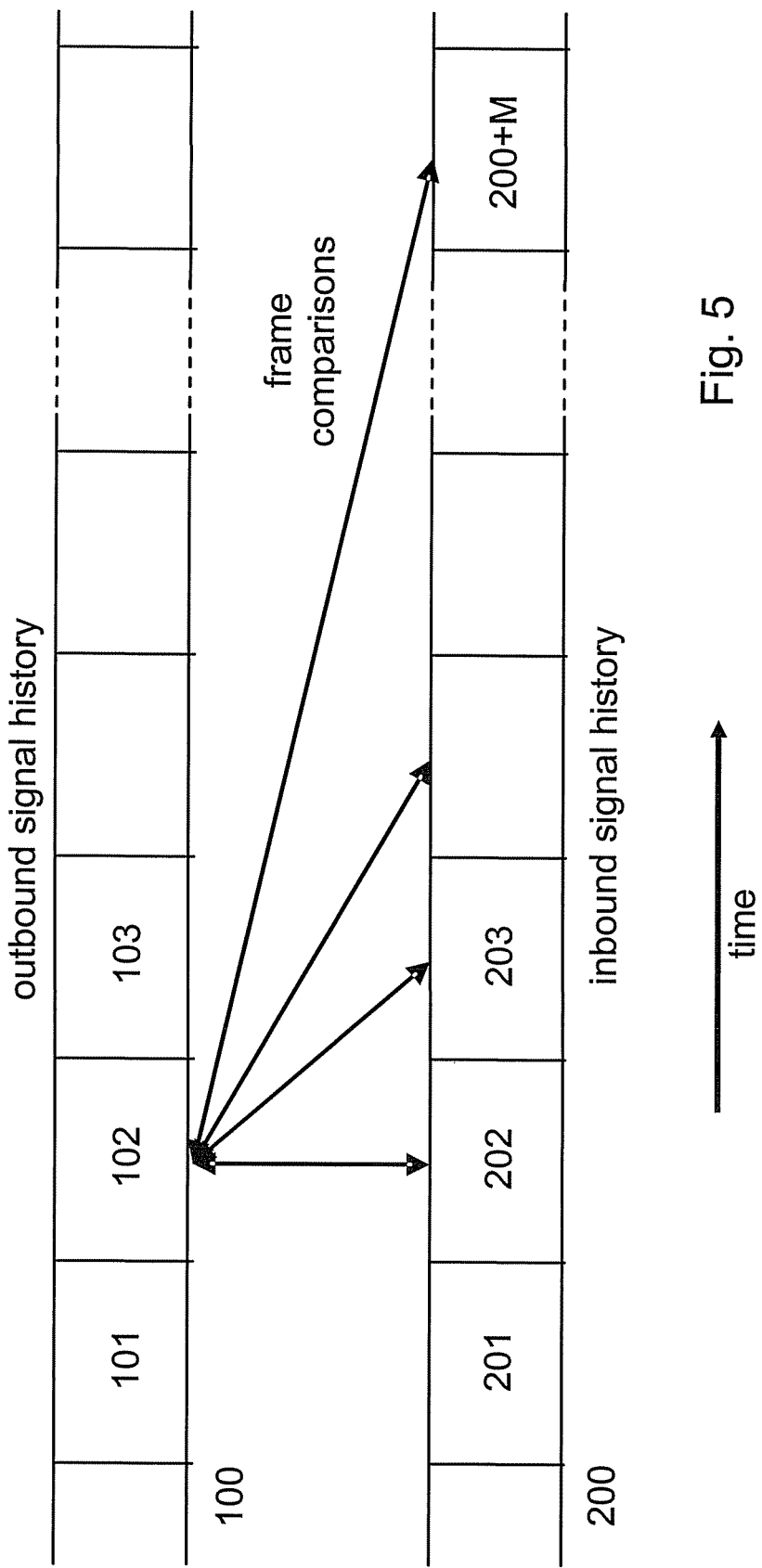
FIG. 5: illustrates comparison of a second selected vector of an outbound signal with a second selected vector and a plurality of successive vectors of an inbound signal.

At step 62 an inbound vector 201 and an outbound vector 101 are selected for comparison. The frames are not shown as overlapping in FIG. 4 and FIG. 5 in order to aid clarity.

At step 63 the selected inbound vector 201 is compared to the selected outbound vector 101 using a correlation coefficient according to the formula:

$$c = \frac{\sum_i (x_i - \bar{x})(y_i - \bar{y})}{\sqrt{\sum_i (x_i - \bar{x})^2 \sum_i (y_i - \bar{y})^2}}$$

Where $x=\{x_1, x_2, \ldots, x_N\}$ represents the Fourier spectrum calculated from the outbound frame and $y=\{y_1, y_2, \ldots, y_N\}$ represents the Fourier spectrum calculated from the inbound frame.

It is worth noting that since an N-point discrete Fourier transform of a real signal is symmetrical about point N/2, that correlation need only be calculated over the first N/2+1 spectral components. Moreover it can be advantageous to restrict the correlation calculation to an ever smaller subset of the frequency spectral components.

The comparison is also performed between the selected outbound vector 101 and the M−1 inbound vectors following the selected inbound vector 201 to find the best match. The value of M determines the maximum echo path delay than can be analysed.

The frame offset value (or relative position) that produces the highest correlation is used to update a histogram of candidate echo path delay values which counts the number of times each relative position is determined to be the relative position of highest correlation. The matching process is repeated a further L−1 times, each time selecting a new pair (102, 202) of inbound and outbound frames following the previous start position (see FIG. 5). A value of 100 has been found to work well for L.

The histogram is characterised in that each bin i represents a relative position i, and the value of a bin i is equal to the count of the number of times a relative position i produced the highest correlation.

If every iteration of the matching process comparison steps is used to update the histogram then this produces a histogram with L entries. In the preferred embodiment, only those echo path delay values (relative positions) that result in a correlation coefficient exceeding a first threshold are used to update the histogram, in which case the number of entries in the histogram, K, may be less than L.

The decision to update the histogram may be further enhanced by only performing the matching process if the outbound frame contains speech or another foreground signal, such as music.

Once the histogram is complete, i.e. the comparison steps have been performed a predetermined number of times (L), the echo path delay estimate, D can be determined from the position of the peak in the histogram by using the sampling frequency of the data samples, S, the frame size N and the frame overlap factor f to convert the bin index i into an estimate of the echo path delay as follows:

$$D = iN(1-f)/S \text{ seconds}$$

In the preferred embodiment the number of delay estimates within a small range of the peak of the histogram, J, is calculated, and the proportion J/K provides an estimate of the likelihood of echo being present. A further binary echo detection decision can be calculated such that echo is declared to be present if J exceeds a second threshold and J/K exceeds a third threshold. In the preferred embodiment, the third threshold is calculated in dependence upon K.

In an alternative embodiment the proportion K/L may be used as an estimate of the likelihood of echo being present. Again this may be compared with a threshold to form a binary echo detection decision.

The mean echo path delay is calculated from the index of the histogram bin with the most elements. The accuracy of the delay estimate can be enhanced by interpolating the values of the bins around the peak in the histogram.

In an alternative embodiment, for each outbound frame the histogram is not only updated in dependence of the relative position producing the maximum correlation, but also in dependence of any relative position with correlation value close to the maximum value, e.g. within 95%. In this case, the number of entries in the histogram (K) may exceed L.

Experimentation by the inventors has shown that the correlation function (sometimes referred to as Pearson's Correlation coefficient) used in the preferred embodiment may be replaced by other similarity metrics including angular separation, Euclidean distance (using normalized data), absolute value distance (normalized data) and Minkowski distance to provide similar echo detection performance.

It will be understood by those skilled in the art that the methods described above may be implemented on a conventional programmable computer, and that a computer program encoding instructions for controlling the programmable computer to perform the above methods may be provided on a computer readable medium.

The invention claimed is:

1. A method of echo detection comprising the steps of:
   generating a series of inbound vectors for an inbound signal;
   generating a series of outbound vectors for an outbound signal;
   repeating a predetermined number of comparison steps comprising the sub-steps of
   selecting an outbound vector from the series of outbound vectors;
   selecting an inbound vector from the series of inbound vectors;
   comparing said outbound vector with said inbound vector and with successive inbound vectors to generate a plurality of similarity metrics;
   determining a maximum similarity metric; and
   determining a relative position of maximum similarity of the compared inbound vector having said maximum similarity metric;
   and after repeating said sub-steps,
   counting the number of times each relative position is determined to be the position of maximum similarity.

2. A method according to claim 1, further comprising the step of: for each outbound vector additionally counting relative positions having a similarity metric close to the maximum similarity metric determined for said outbound vector.

3. A method according to claim 1, in which a relative position is counted only in the event that the maximum similarity metric exceeds a first threshold.

4. A method according to claim 1, in which a relative position is counted only in the event that the outbound vector contains speech or foreground signal.

5. A method according to claim 1, further comprising the step of determining a peak relative position in dependence upon the relative position counted the most number of times.

6. A method according to claim 5, further comprising the step of determining the relative positions counted with a value equal to or close to said peak relative position.

7. A method according to claim 6, further comprising the step of determining a likelihood that echo is present in dependence upon the number of relative positions counted with a value equal to or close to said peak relative position.

8. A method according to claim 3, further comprising the step of determining a likelihood that echo is present in dependence upon the number of relative positions counted.

9. A method according to claim 5, further comprising the step of determining a delay in dependence upon said peak relative position.

10. A non-transitory computer readable medium carrying a computer program for implementing the method according to claim 1.

11. A computer processor carrying a computer program for implementing the method to claim 1.

* * * * *